Dec. 14, 1965  J. O. CLARK ETAL  3,223,997
DOPPLER CORRECTION IN A FREQUENCY DIVERSITY FREQUENCY JITTERED
PULSE DOPPLER RADAR BY MEANS OF DIGITAL PHASE COMPUTATION
Filed June 14, 1963
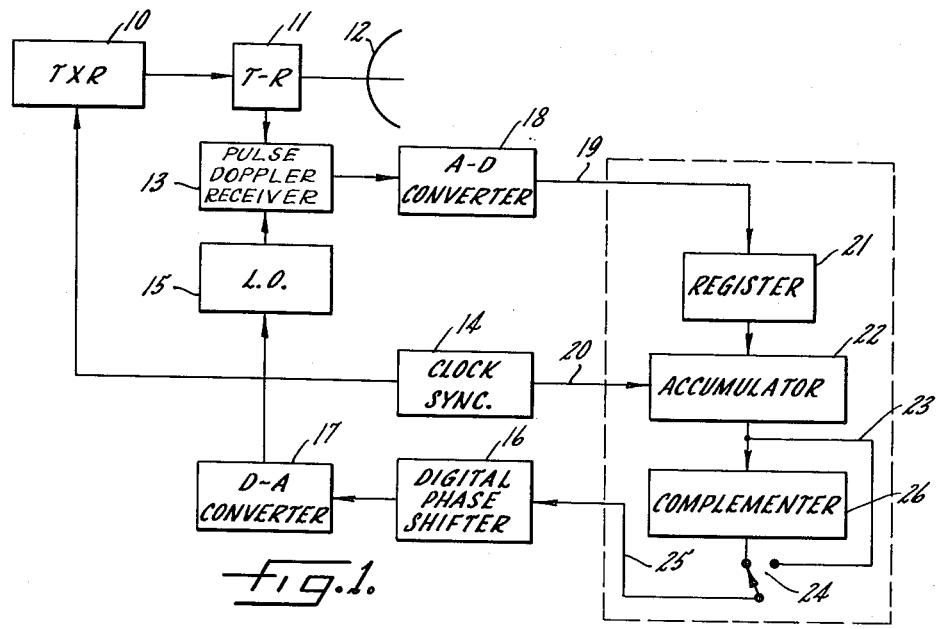
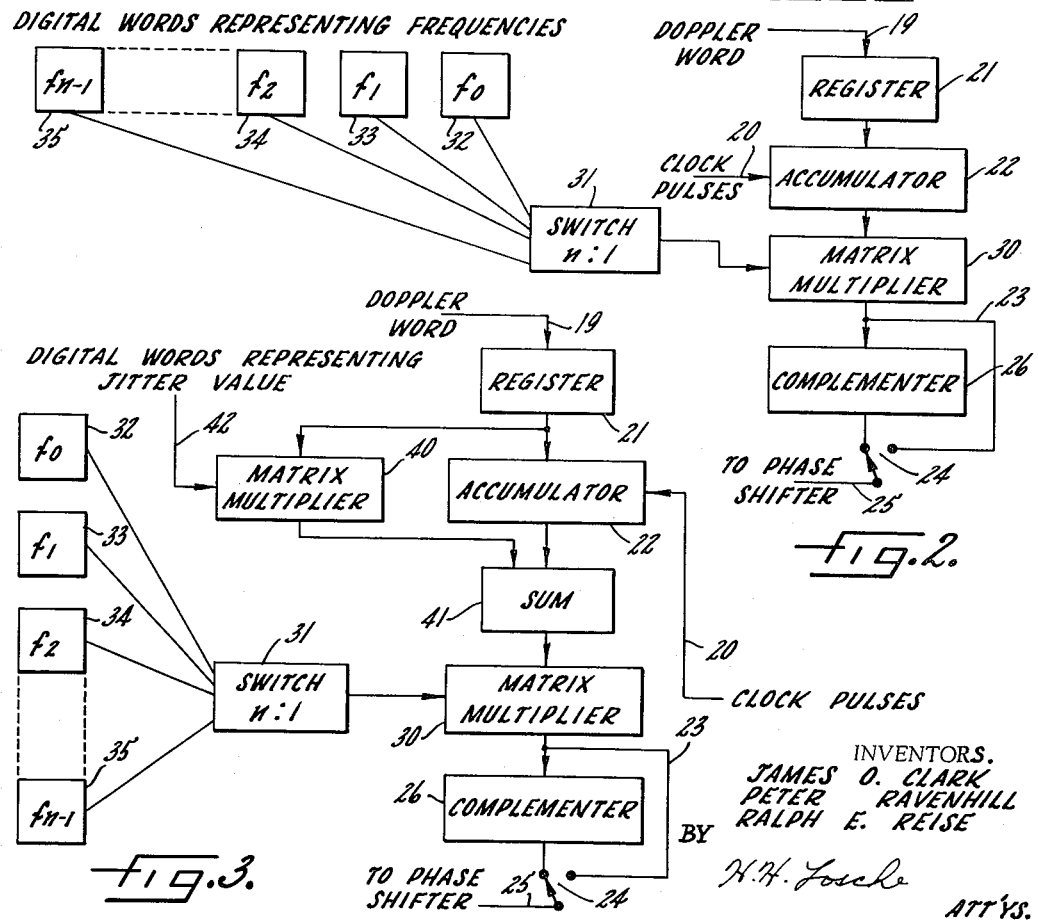
INVENTORS.
JAMES O. CLARK
PETER RAVENHILL
RALPH E. REISE
BY
ATT'YS.

United States Patent Office 3,223,997
Patented Dec. 14, 1965

3,223,997
DOPPLER CORRECTION IN A FREQUENCY DIVERSITY FREQUENCY JITTERED PULSE DOPPLER RADAR BY MEANS OF DIGITAL PHASE COMPUTATION
James O. Clark, Ellicott City, Peter Ravenhill, Baltimore, and Ralph E. Reise, Severna Park, Md., assignors, by mesne assignments, to the United States of America as represented by the Secretary of the Navy
Filed June 14, 1963, Ser. No. 288,055
9 Claims. (Cl. 343—8)

This invention relates to Doppler correction in a pulsed Doppler tracking radar and more particularly to a digital means of computing the phase shift in a digital word, to which phase shift the Doppler signal has been subjected by virtue of target movement, and the use of this digital phase shift word to correct the Doppler frequency received in compensation for phase shift due to the target motion.

Doppler correction in a pulsed Doppler tracking radar is normally accomplished by introducing a frequency shift in the local oscillator signal to one of the several receiver mixers. For any given target velocity the sidestep frequency, or frequency that is necessary to correct or compensate for frequency shift of the transmitted frequency caused by target movement, is proportional to the transmitted frequency jittered radar, there arises the problem of generating a sidestep frequency for each transmitted frequency and for jitter value. Generation of this sidestep frequency for each transmitted frequency in a diversity or jittered radar is necessary for Doppler correction.

In this invention for Doppler correction there is provided the computation of the phase shift which the returned radar signal has undergone due to target motion. This phase shift is then generated and applied to the receiver local oscillator signal in a manner such that compensation is made for the phase shift due to target motion. This is accomplished by either utilizing the signal of a digital receiver or of converting the signal from an analog receiver to digital words and applying these dgiital words to a diital register. A digital accumulator coupled to the digital register, and clocked by the same synchronous pulses which establish the pulse repetition frequency of the transmitting radar, periodically sums the register digital words to produce digital words representative of the distance proportional to the movement of the target from the beginning of the dwell time to the time of the next summing or synchronous pulse. The output of the accumulator provides the digital word representative of the phase shift which is applied, after converting to analog voltage, to the local oscillator of the receiver controlling this oscillator to compensate for the phase shift produced by target motion. The digital computation of the phase shift can be performed in approximately two microseconds by this means and takes account of the frequency to be received so that frequency diversity operation and frequency to be received so that frequency diversity operation and frequency jitter operation may be readily achieved. This invention has the additional advantage of hardware economy and of being readily adaptable for frequency diversified pulse Doppler (FDPD) tracking radar and, in addition, lends itself conveniently to the incorporation in a digital receiver system wherein all signal correction is performed digitally. It is accordingly a general object of this invention to provide digital phase computation means for pulse Doppler tracking radar utilizing frequency diversification and frequency jitter to control the receiver in a manner to compensate for the phase shift in the Doppler signals caused by target movement.

These and other objects and the attendant advantages, features, and uses of this invention will become more apparent to those skilled in the art as a more detailed description proceeds when considered along with the accompanying drawing in which:

FIGURE 1 is a block circuit diagram of a simplified radar system in conjunction with a block circuit diagram of the Doppler correction circuit of this invention;

FIGURE 2 is a block circuit diagram of the Doppler correction circuit for frequency diversified Doppler tracking radar; and FIGURE 3 is a block circuit diagram of the phase shift computer circuit for Doppler tracking radar having both frequency diversification and frequency jitter capabilities.

Referring more particularly to FIGURE 1, a block circuit diagram of a conventional pulse Doppler tracking radar is shown in simplified form in which a radar transmitter 10 is coupled through a transmit-receive switch 11 to a radar antenna 12 with a receiver 13 being coupled to the transmit-receive switch 11, as is well understood by those skilled in the art. The transmitter 10 is timed in its pulse repetition frequency by clock or synchronous pulses from a source 14, and the receiver 13 has its signals mixed from signals of a local oscillator 15, this local oscillator being controlled from a phase shifter 16 herein illustrated as being a digital phase shifter having the digital words therefrom converted to analog voltage in a digital analog converter 17. While the output of the receiver 13 may be in digital form as from a digital receiver, a conversion of analog-to-digital signal information is provided for by an analog-to-digital converter 18 for convenience in the description and understanding of the invention where the receiver is of the more common analog voltage type producing analog voltage output proportional to the amplitude of the echo pulses received. Digital words are provided on the output of the converter 18 by way of the conductor means 19 and the clock pulse or synchronizing source 14 also has an output on the conductor means 20 for the phase shift computer in the dotted line area.

In accordance with this invention the digital word output on the conductor means 19 is entered into a digital register 21. This digital word is entered into the register 21 at the beginning of each tracking dwell or the first returned echo from target illumination of the target by the transmitted pulse of the radar and represents target velocity the tracking dwell being the time that the radar beam illuminates the target in the tracking sweep. The number of bits comprising the digital word is dependent on the desired accuracy of velocity tracking. The bit size is chosen such that the answer produced in computing the phase shift is readily usable in the digital phase shifter 16, as will later be made clear. The Doppler word representing velocity in the register is summed regularly in an accumulator 22 coupled to the register 21 at a rate determined by the clock or synchronous pulses from the source 14 coupled to the accumulator 22 by the conductor means 20. That is, each echo pulse producing the velocity word in the register 21 will be destructively read out of the register 21 into the accumulator 22 with each succeeding clock or synchronous pulse from 14. Since the adder in the accumulator 22 is capable of storing as well as adding and subtracting the velocity words from the register 21, the summed or accumulated word will account for velocity changes of the target. The output of the accumulator 22 will provide accumulated digital words which will be proportional to the distance moved by the target in the time after the beginning of the target dwell and the occurrence of the synchronous pulse. If the velocity, corresponding to one of the bits of the Doppler word, has been chosen such that it corresponds to a movement of the target of $\lambda_0$ in one clock period from one clock pulse to the succeeding clock pulse, where $\lambda_0$ is the wavelength corresponding to the transmitted frequency $f_0$, then a five bit digital word may be taken from the accumulator 22 and this digital word will represent the magnitude of the fractional phase correction to be applied to the incoming signal in the receiver 13. Higher magnitude bits of the accumulator digital word may be ignored since they represent full cycles while lower bits may be discarded since they represent greater accuracies of phase correction than are actually necessary. For example, the first bit would represent 180° of the cycle, the second bit would represent 90° of the cycle, the third bit would represent 45° of the cycle, the fourth bit would represent 22½° of the cycle, and the fifth bit would represent 11¼° of the cycle or 360°/32. It is assumed that this correction of phase in 11¼° increments is adequate for signal correction although greater accuracies can be readily obtained by utilizing additional bits, where desired. The five bits of the Doppler word representing phase shift may be applied directly to the digital phase shifter 16 by way of the conductor means 23 through a switch 24 by the conductor means 25. Where the phase shifter of the radar system is not a digital phase shifter, such as a ferrite device or a traveling wave tube, conversion of the digital word can be obtained by a digital-to-analog converter. For a clear example herein the phase shifter is described as a digital phase shifter 16 and a digital-to-analog converter 17 is shown coupling the digital phase shifter 16 to the local oscillator 15. This will cause the receiver 13 to compensate for the phase shift produced by target motion by the control of the output frequency of local oscillator 15 for the mixer in the receiver 13. In a circuit parallel to the conductor means 23 on the output of the accumulator 22 is a complementer 26 which may be switched in series with the accumulator 22 and digital phase shifter 16 by the switch 24 to provide the complement of the digital phase shift word on the output of the accumulator. The switch 24 may be switched for approaching or receding targets to track approaching or receding targets by appropriate switch position. For example, for approaching targets, switch 24 may be switched to the right contact coupling the accumulator 22 directly to the digital phase shifter, or the receiver switch 24 may be switched to the left contact thereby applying the complement of the digital word to the digital phase shifter for receding targets.

In the operation of the device illustrated in FIGURE 1, it may be readily understood from the above description that Doppler correction may be rapidly attained in the receiver 13 for moving targets which produce a phase shift in the Doppler signal by computing this phase shift in the digital computing means illustrated within broken lines of FIGURE 1. Any received Doppler signal produced by a moving target will be converted to a digital word on the output 19 of converter 18 to be entered into register 21 and this word periodically summed in the accumulator 22 to produce the digital phase shift word representing an amount proportional to the distance traveled by the target in the period beginning the tracking dwell to the time established by the clock summing pulse in the accumulator. This phase shift digital word will be applied to the digital phase shifter 16 and converted into analog voltage by the digital-to-analog converter 17 for the control of the local oscillator 15 to correct the phase of the oscillator frequency to cause correction of the phase of the Doppler frequency of the received signal in the receiver 13 representative of that target movement. Switch 24 will be appropriately switched for closing or opening targets.

Referring more particularly to FIGURE 2, a block diagram illustrates a circuit to be used where there is frequency diversity commonly used in pulse Doppler tracking radar. In FIGURE 2, like reference charactres will be used for like parts as shown in FIGURE 1. In this embodiment a matrix multiplier 30 is incorporated in the output coupling of the accumulator 22 to the phase shifter conductor 25. A second input to the matrix multiplier 30 is from a selector switch 31 having "$n$" positions, each position relating the selected frequency in a ratio to the fundamental frequency, $f_0$. Coupled to the switch 31 as inputs thereto are digital words representing frequencies to be used in the frequency diversification of the radar transmitter 10 and identified by $f_0$, $f_1$, $f_2$, etc., to $f_n-1$. The corresponding blocks 32, 33, 34, and 35 represent storage means of the "$n$" words all coupled to be selected by the switch means 31 such that any "$n$" word selected will provide on the output to the matrix multiplier 30 the ratio of that "$n$" word over the fundamental frequency $f_0$ in digital notation. If the radar is required to operate on a frequency of $f_0$, the output of the accumulator 22 will be multiplied by one in the matrix multiplier 30. If the radar is required to operate on a frequency of $f_1$ in addition to the frequency $f_0$, then the output of the accumulator 22 is fed to the matrix multiplier 30 and multiplied by the "$n$" word $f_1/f_0$ in binary notation. The selector switch 31 may be used to select any frequency which the radar is transmitting to feed the correct frequency word at the appropriate time to the matrix multiplier 30. The switch 31 may be coupled to the switching circuit with the transmitter 10 switching in the diversified frequencies so that switch 31 will always switch the corresponding frequency $f_1$ through $f_n-1$ to the matrix multiplier 30 at precisely the same time that these frequencies are being transmitted.

Referring more particularly to FIGURE 3, like reference characters for like parts and components are applied to the circuit elements in the same manner as for FIGURES 1 and 2. Since most Doppler radars operate with jitter of the transmitted pulse, the time between transmitted pulses is continually varying. Thus, the output of the accumulator 22 in FIGURES 1 and 2 will not, in this mode of operation, represent the distance moved (and hence phase shift) at the instant that the signal is received. To the output of the accumulator 22 must be added a number representing the distance which the target will move in the jitter time. This is accomplished by utilizing a matrix multiplier 40 in parallel with the accumulator, and the output of the matrix multiplier 40 and the output of the accumulator 22 are summed in a summing circuit 41 prior to the application of the phase shift digital word to the matrix multiplier 30. A digital word representing the jitter inserted on the transmitted pulses to be received in echo is applied as a multiplier over the conductor means 42 to the matrix multiplier 40 and the digital word product from the matrix multiplier 40 is applied to the summing circuit 41 along with the phase shift digital word of the accumulator 22. The output of this matrix multiplier 40 represents the distance moved by the target in the jitter time and this digital word is added to the digital word output of the accumulator 22 to produce a digital word output from the summing circuit 41 representative of the phase shift produced by target travel taking into account the phase shift deviation produced by the jitter value. The matrix multiplier 30 modifies the phase shift digital word in accordance with the frequencies transmitted in the frequency diversified manner to produce a correct phase shift digital word on the output 23 through switch 24 to the digital phase shifter circuit 16 over the conductor means 25.

The operation of the mode of operation and embodiment illustrated in FIGURE 3 is similar to that described for FIGURES 1 and 2 with the exception that the jitter value in digital notation is accounted for in the production of the final phase shift digital word so that proper Doppler correction will be accomplished in the receiver 13 of the Doppler radar tracking system.

The register 21, accumulator 22, complementer 26, digital switches, and digital storage means shown and described herein are conventional and well-known components, as may be found and more fully described in the text Basics of Digital Computers, volumes 1, 2, and 3, by John S. Murphy, 1958, published by John F. Rider Publisher, Inc. Further description of these components will not be given herein since the functions and capabilities thereof are made known in the text.

While many modifications and changes may be made in the constructional details and features of this invention to accomplish the purpose of producing a Doppler phase shift correction resulting from target movement, it is to be understood that we desire to be limited in our invention only by the spirit and scope of the appended claims.

We claim:
1. Doppler correction in a pulsed Doppler tracking radar by means of digital phase computation comprising:
   a pulse Doppler radar receiver for receiving echo pulse Doppler signals of a target from transmitted pulses and converting each echo signal to digital word representative of target velocity;
   a digital register coupled to receive each said digital echo word;
   an accumulator coupled to said register and pulsed by a transmitter synchronizing source to sum the Doppler digital words at the pulsed rate to produce an accumulated digital word representative of the distance proportional to the movement of the target from the beginning of the dwell to the time of the pulse; and
   a complementer adapted to be selectively switchable in and out of the output of said accumulator whereby the accumulator output represents the digital phase shift word produced by target movement, the digital phase shift word being selectably presented by its complement in accordance with the existence of approaching and receding targets.

2. Doppler correction in a jittered pulse repetition frequency diversified pulse Doppler radar by means of digital phase computation comprising:
   a pulse Doppler radar receiver for receiving echo pulse Doppler signals of a target reflecting transmitted signals and converting these signals to digital words representing target velocity;
   a digital register coupled to receive said digital words;
   a digital accumulator coupled to said digital register and pulsed by a transmitter synchronizing source to sum the Doppler digital words at the pulsed rate to produce on an output thereof an accumulator digital word representative of the distance proportional to the movement of the target from the beginning of target dwell to the time of the synchronizing pulse;
   a complementer switchable selectively in and out of said accumulator output to provide for the complement of the accumulator digital word for approaching and receding targets, said accumulator digital word output being the computed phase shift; and
   means associated with the phase shift computation to adapt same for transmitted frequency jitter and frequency diversity whereby the receiver Doppler signals can be corrected in phase corresponding to target movement.

3. Doppler correction means as set forth in claim 2 wherein
   said synchronizing source pulsing said accumulator is a clock pulse source to cause said accumulator to sum the register digital words upon the application of each clock pulse.

4. Doppler correction means as set forth in claim 3 wherein
   said means associated with the phase shift computation to adapt same for frequency diversity is a digital multiplier in the output of said accumulator and a selective switching means coupled to said multiplier for selectively switching in digital words representing the frequency being transmitted to multiply said accumulator digital word thereby producing a phase shift digital word corresponding to the instantaneous transmitted and received frequency of moving targets.

5. Doppler correction means as set forth in claim 4 wherein
   said means associated with the phase shift computation to adapt same for frequency jitter is a matrix digital multiplier coupled in parallel with said accumulator to a summing means and a digital word applied to said matrix multiplier representing the jitter value thereby producing a digital multiplication of the register digital word for that jitter value and the digital word for that jitter value to sum with the accumulator digital word whereby the summed digital word is representative of the phase shift produced by a moving target for said jitter value.

6. Doppler correcting means as set forth in claim 5 wherein
   said complementer is in parallel with the accumulator output to produce the complement of the phase shift digital word whereby said switchable output is switched in one position to conduct digital phase shift words for approaching targets and said switchable output is switched in the other position to conduct the complement digital phase shift words for receding targets.

7. Doppler correction for pulsed Doppler tracking radar by means of digital phase computation comprising:
   a digital register for receiving digital words representative of the velocity of a target echo received;
   a digital accumulator coupled to said digital register and coupled to receive clock pulses to produce accumulated digital words of said digital register on an output thereof representative of the distance proportional to the movement of the target from the beginning of dwell to the clocked time of the accumulation, establishing a digital phase shift word;
   a parallel circuit coupled to the digital accumulator output terminating in a switch selectable to connect either of said parallel circuits on an output thereof, one parallel circuit including a complementer to produce the complement of the digital phase shift word on its output, said switch being switched to the appropriate output for approaching and receding targets; and
   means associated with said register and accumulator combination to adapt the digital phase shift computations for frequency jitter and frequency diversity whereby the Doppler signals can be corrected in phase corresponding to target movement.

8. Doppler correction as set forth in claim 7 wherein said means associated with said register and accumulator for frequency diversity is a first matrix multiplier in the coupling between said digital accumulator and said parallel circuit, said first matrix multiplier being coupled through a selective switch to one of a plurality of digital word sources, each digital word source representing a different frequency, and the digital word selected by said switch being representative of the frequency used to provide the digital word of target velocity.

9. Doppler correction as set forth in claim 8 wherein said means associated with said register and accumulator for frequency jitter is a digital summing circuit in said coupling between said digital accumulator and said first matrix multiplier, and a second matrix multiplier in parallel with said digital accumulator, said second matrix multiplier having a multiplier input thereto in digital words representative of jitter value for multiplying said register digital words, the second matrix multiplier output and said digital accumulator outputs being summed in said digital summing circuit whereby the computed digital phase shift output is a digital word usable to correct the Doppler phase of the received target echo signal.

No references cited.

CHESTER L. JUSTUS, *Primary Examiner.*